July 31, 1962 — A. BORK — 3,046,870
TOASTER ACCESSORY
Filed Nov. 15, 1960 — 2 Sheets-Sheet 1
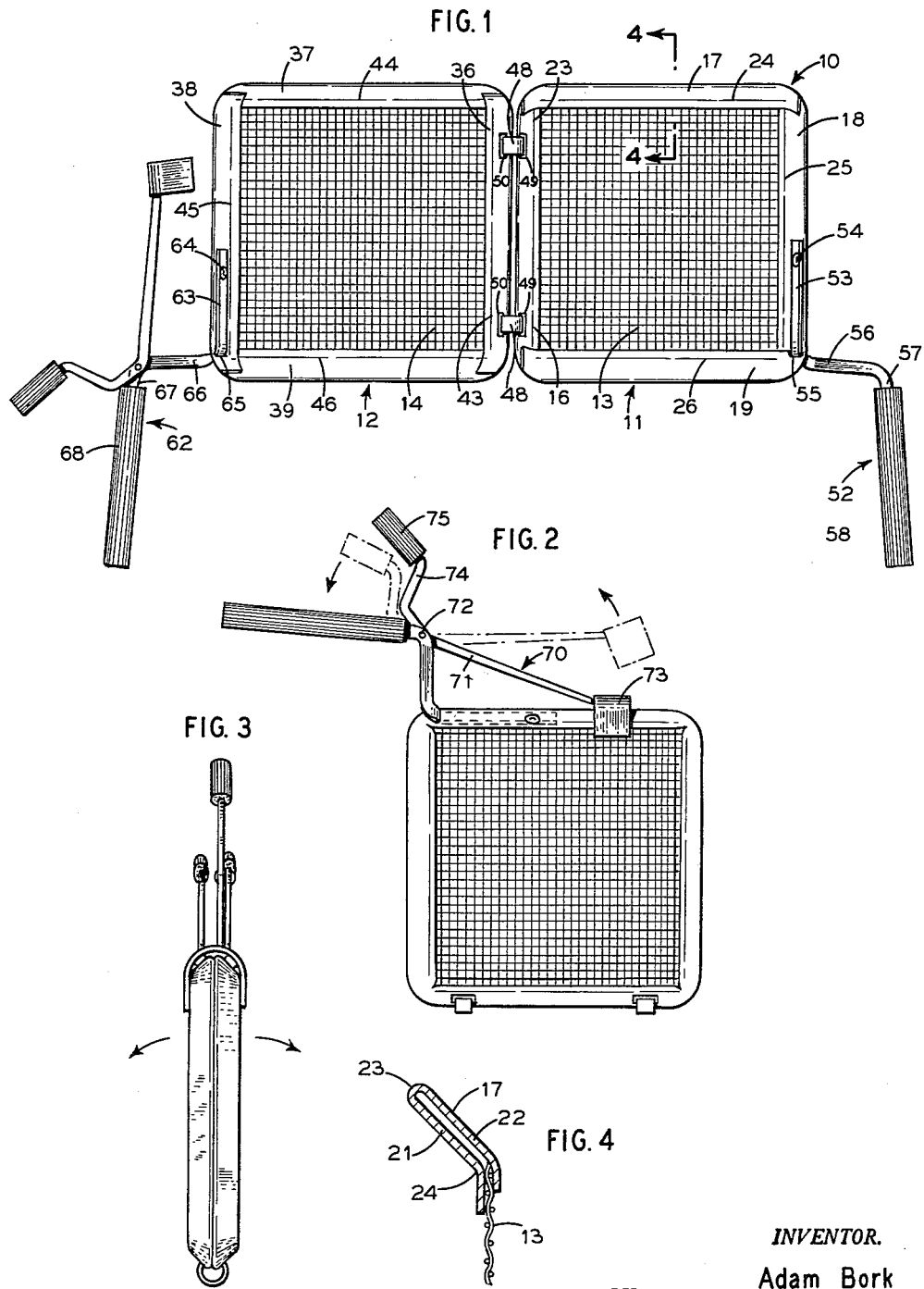
INVENTOR.
Adam Bork
ATTORNEYS July 31, 1962

A. BORK 3,046,870

TOASTER ACCESSORY

Filed Nov. 15, 1960

INVENTOR.
Adam Bork
BY
ATTORNEYS

United States Patent Office 3,046,870
Patented July 31, 1962

3,046,870
TOASTER ACCESSORY
Adam Bork, 164 Beach 65th St., Arverne, N.Y.
Filed Nov. 15, 1960, Ser. No. 69,349
5 Claims. (Cl. 99—402)

This invention relates generally to a novel and improved kitchen device, and is especially concerned with a unique accessory for automatic toasters.

The instant application discloses improvements is devices of the type shown in my prior United States Patent No. 2,849,947, and my copending patent application Serial No. 760,315, now Patent No. 2,962,957, issued December 6, 1960, of which this application is a continuation-in-part.

As is well-known, the fixed size and depth of toast-receiving openings in an automatic toaster precludes or makes extremely difficult the toasting of relatively small or crumbly articles of food, such as bread ends, muffins, bagels, cookies, and the like. Such small or irregularly shaped food pieces often become lodged or stuck in a toaster, it being necessary to pry such pieces from the toaster, which presents serious hazards, including the danger of burning and electrical shock, and usually results in broken toaster wires.

It is one object of the present invention to provide an accessory for an automatic toaster which completely overcomes the above-mentioned difficulties, being adapted to quickly and easily receive food pieces of small or irregular size and hold the same during a toasting operation, and being readily withdrawable from the toaster and openable for convenient removal of the toasted food. By employing the instant device, neither the hands of the operator nor a prying device need enter the toaster, so that danger of injury to the person and damage to the toaster are completely obviated.

It is another object of the present invention to provide a toaster accessory of the type described which may be employed for holding sandwiches during toasting or heating thereof, and may even be utilized for the grilling or heating of hamburgers and other foods, to greatly simplify many cooking operations by utilizing an automatic toaster for such operations.

It is a more particular object of the present invention to provide a highly improved construction for latching an accessory of the type described above in its food-holding condition, which latching construction is quickly and easily releasable for opening the accessory and removing contained food.

It is a further object of the present invention to provide a toaster accessory having the advantageous characteristics mentioned in the preceding paragraphs which is extremely simple in construction and operation, entirely safe, durable and reliable in use, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a plan view showing a toaster accessory of the present invention in open condition;

FIGURE 2 is an elevational view showing the accessory of FIGURE 1 in closed condition, and illustrating the latching construction in dot-and-dash outline in its release condition;

FIGURE 3 is an edge view of the instant toaster accessory in closed condition, taken from the right-hand side of FIGURE 2;

FIGURE 4 is a partial sectional view taken substantially along the line 4—4 of FIGURE 1;

Figure 5:
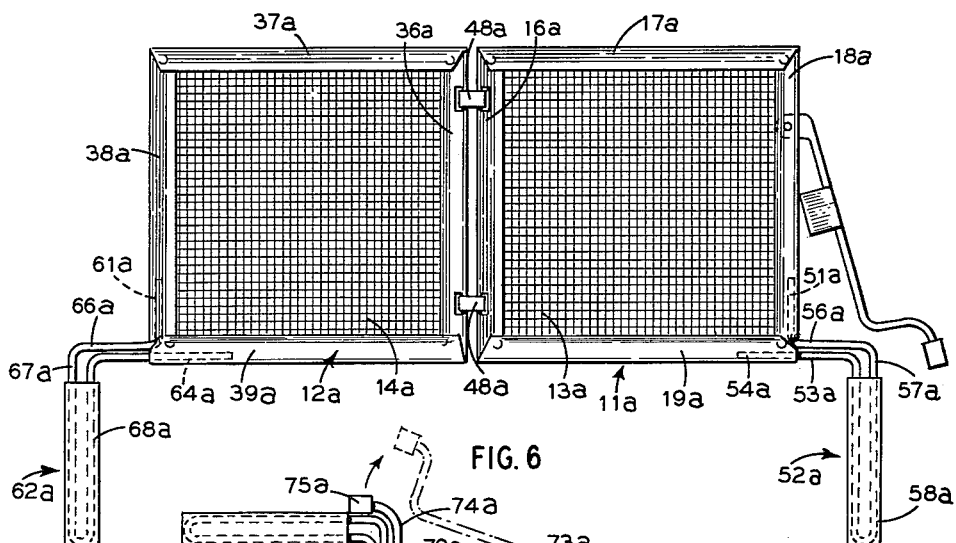
FIGURE 5 is a plan view showing a slightly modified accessory construction of the present invention in open condition.
Figure 6:
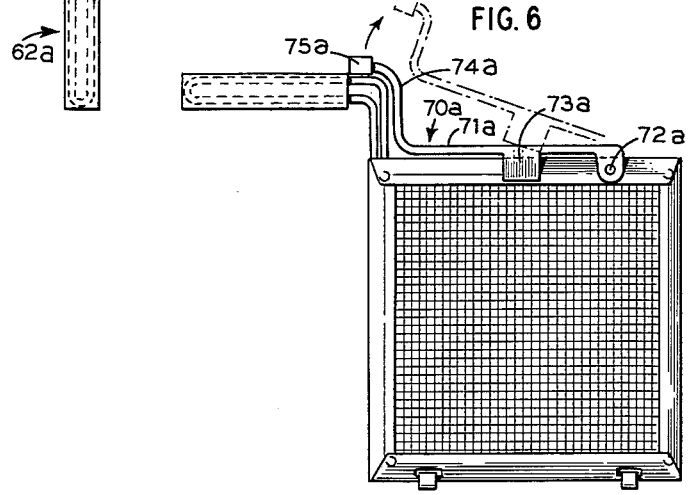
FIGURE 6 is an elevational view showing the accessory of FIGURE 5 in closed condition, and illustrating the latch construction in dot-and-dash outline in its release position.

Referring now more particularly to the drawings, and specifically to FIGURES 1-4 thereof, there is shown therein a toaster accessory, generally designated 10, constituted of a pair of substantially identical, open, dished frames 11 and 12. The frames 11 and 12 may each be substantially rectangular, including an openwork central covering, screen or mesh, as at 13 and 14.

More specifically, the frame 11 includes four side or edge pieces 16, 17, 18 and 19 arranged in rectangular formation and each of a generally channel-shaped configuration in cross section, as seen in FIGURE 4. That is, the channel-like side or edge pieces 16–19 are arranged so that the adjacent ends of the respective side or edge pieces form corner joints, the respective side or edge pieces of each of the corner joints being in a right-angular relation with each other having the hollow sides of their channel configurations facing generally inward. If desired, the several side or edge pieces 16–19 may be fabricated from a single elongate channel appropriately cut and bent at the corners or intersections of the edge pieces.

As seen in FIGURE 4, the side or edge piece 17 includes a pair of facing walls 21 and 22 joined at their outer extremities by a bight portion 23, the walls receiving therebetween and firmly holding an edge portion of the reticulated element or screen 13. Further, the several side or edge pieces 16–19 are formed with longitudinally extending bends 24, respectively, which serve to offset the screen element 13 from the distal or bight regions of the frame elements and afford to the frame a dished, concave or hollow configuration.

The frame 12 is similarly constructed of four channel-like frame elements 36, 37, 38 and 39, which are arranged in end-to-end right-angular relation and embracingly engaging the bounding edges of reticulated member or screen 14. The frame elements 36–39 may also be integrally fabricated of an elongate channel length appropriately cut and bent at the intersections or corners of the frame elements, and the frame elements formed with longitudinally extending folds 43, 44, 45 and 46 affording a dished configuration to the frame 12.

As seen in FIGURE 1, the frame elements 11 and 12 are arranged in side-by-side, generally coplanar relation, with their side or edge pieces 16 and 36 in adjacent relation. A hinged connection is defined between the adjacent side pieces 16 and 36 of the frames 11 and 12 by any suitable means, such as a pair of annular elements or loops 48 each passing loosely through a pair of elongate apertures or slots 49 and 50 formed respectively in the side pieces 16 and 36. By this hinged connection, the frames are swingable between their side-by-side generally coplanar or open condition of FIGURE 1 and the closed condition of FIGURES 2 and 3 with the frames in substantially congruent, facing relation. In the facing relation of FIGURES 2 and 3, with the dished sides of frames 11 and 12 facing toward each other, the frames are complementary to define a receptacle for containing food.

At the distal side or edge piece 18 of the frame 11, remote from the hinged edge piece 16, there is carried a handle, generally designated 52. The handle 52 includes a shank 53 which may be fixed at one end to the edge piece 18, as by a fastener 54, and extends longitudinally along the inner side of the latter edge piece toward the adjacent end of the edge piece 19, where it is bent to extend outward through an opening 55. Exteriorly of the opening 55 the shank defines a connection portion 56 extending outward from and generally normal to the edge piece 18, in general alignment with the edge piece 19. The outer portion 57 of the connection portion 56 is bent to extend generally parallel to and spaced outward from the edge piece 18 where it is provided with a covering sleeve 58 to define a handgrip portion.

A similar handle, generally designated 62, is carried by the distal or outer edge piece 45 of the frame 12 remote from the hinged edge piece 36. The handle 62 is similar to the handle 52, including a bar or shank 63 having one end fastened, as by a rivet 64 to the edge piece 38, on the inner side thereof, and extending along the edge piece 38 toward its corner or intersection with the edge piece 39, where it is bent to extend outward through an opening 65 and thence defining a connection portion 66 disposed generally normal to the distal edge piece 38 in substantial alignment with the edge piece 39. The connection portion is bent at its outer end to extend generally parallel to the edge piece 38, as at 67, where it is covered with a protective sleeve 68 for convenient manual grasping. Thus, the handle 52 is substantially coplanar with its carrying frame 11, while the handle 62 is substantially coplanar with its carrying frame 12, as best seen in FIGURE 3.

By convenient manual operation, the handgrip portions 58 and 68 may be grasped and swung from the open condition of FIGURE 1 toward each other into side-by-side relation to close the frames 11 and 12, as seen in FIGURES 2 and 3.

Pivotally carried by one of the handles, say the handle 62, is a latching device, generally designated 70. The latching device includes an elongate member, lever or bar 71 pivoted intermediate its ends, as by a pin 72 to the handle 62 at the juncture of the connection portion 66 and handgrip extension 67. That is, the bar or lever 71 extends and is contained within a plane parallel to the plane of the handle 62 formed by the connection portion 66 and the handgrip extension 67, while the pivot pin 72 extends generally normal to the plane of the associated frame 12. Thus, the lever or bar 71 is substantially in the plane of the handle 62 which it is attached. The lever or bar 71 extends generally toward the frame edge piece 38 and is there provided with a generally U-shaped clip or clasp 73 swingable into and out of embracing engagement with the edge pieces 18 and 38 when the frames 11 and 12 are in their closed, facing condition, as shown in solid lines in FIGURES 2 and 3. Extending in the other direction from the pivot 72, the lever or bar 71 is bent to form an angulate portion 74, and carries on its extremity an offset finger-actuable member or sleeve 75. Upon swinging movement of the clip 73 into and out of embracing engagement with the frame edges 18 and 38, the finger-actuable member 75 moves, respectively, away from and toward the adjacent handgrip portions 58 and 68 of the handles 52 and 62. Thus, upon swinging movement of the frames 11 and 12 into their facing relation of FIGURE 2, the latching device 70 may initially assume the dot-and-dash outline position. Upon finger actuation of the member 75 to swing the latter clockwise, as seen in FIGURE 2, the clip 73 will engage and latch the frames in their closed, facing condition, as with the latching device in the solid-line position. Of course, release of the latching device 70 may be quickly and easily accomplished by mere reversal of the above-described operation, to swing the latching device 70 counter-clockwise, in the direction of the arrows, thereby permitting opening movement of the frames 11 and 12. Obviously, this latching-and-unlatching procedure may conveniently be a one-finger operation with the above-described construction.

In the embodiment shown in FIGURES 5-8, a pair of generally rectangular openwork, dished frames 11a and 12a are provided across their central regions with reticulated members or screens 13a and 14a.

Specifically, the frame 11a includes four rectangularly arranged side or edge members 16a, 17a, 18a and 19a, and the mesh or screen element 13a extending across the rectangular arrangement of side or edge pieces to define the dished frame 11a. The frame 12a includes four rectangularly arranged frame members 36a, 37a, 38a and 39a defining a framework substantially congruent to that of frame 11 and provided with the screen or mesh 14a extending across the space between the frame members.

The adjacent frame side or edge pieces 16a and 36a are hingedly connected together by suitable means, such as a pair of rings or loops 48a each extending loosely through both of the adjacent edge pieces to hingedly connect the frames for swinging movement into and out of facing relation with each other.

A pair of handles 52a and 62a extend respectively outward from frames 11a and 12a, substantially coplanar therewith for conveniently manually effecting relative swinging movement of the frames into and out of their facing relation. The handle 52a may be fabricated of an elongate member 53a bent upon itself to define a generally U-shaped portion 57a which is located outward of and generally parallel to the distal edge piece 18a. The elongate member 53a extends generally normally from the portion 57a by a connection portion 56a to the frame corner or junction of frame elements 18a and 19a where a pair of rod portions or extensions 51a and 54a are respectively secured to and extend along the frame members 18a and 19a. The rod portions or extensions 51a and 54a extend inside their respective frame elements 18a and 19a and are frictionally secured thereto. The connection portion 56a may extend generally normal to the distal frame edge portion 18a, in substantial alignment with the frame edge portion 19a. Provided on the outlying handle portion 57a is a sleeve or handgrip member 58a.

Figure 7:
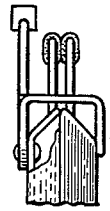
FIGURE 7 is a partial edge view of the device of FIGURE 6 taken from the right-hand side thereof, and broken away for clarity of understanding.
Figure 8:
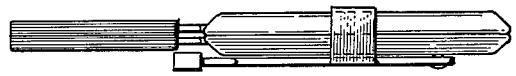
FIGURE 8 is a top view of the construction shown in FIGURE 6.

The handle 62a may be substantially identical to the handle 52a, including a generally U-shaped outlying portion 67a covered by a handgrip member or sleeve 68a. A connection portion 66a extends generally normal to and inward from the handgrip portion 67a to the corner or inner section of frame elements 38a and 39a, where a pair of rod portions or extensions 61a and 64a are respectively secured to and extend along the frame members 38a and 39a. By this construction, each of the handles 52a and 62a is respectively coplanar with its carrying frame 11a and 12a and located for swinging movement of the handgrip portions 57a and 67a into and out of side-by-side relation upon swinging movement of the frames into and out of their facing relation, as seen in FIGURES 7 and 8.

A latching device, generally designated 70a includes an elongate element or lever 71a adapted to extend along the distal edge piece of one frame, say the edge piece 18a, and having one end pivoted, as at 72a to the latter edge piece at a location spaced from its handle 52a. The pivot 72a extends generally normal to the frame 11a to mount the latching member 70a for swinging movement about an axis generally normal to the carrying frame.

The elongate member 71a of the latching member 70a is bent, as by a portion 74a to extend outward, and is provided at its distal end with a finger-actuable member 75a movable into and out of proximate relation with the handle 52a. At a location intermediate the end pivot 72a and the offsetting portion 74a, the elongate member 71a of the latching device 70a is provided with a generally U-shaped clip or clasp 73a. Upon swinging movement of the latching member 70a, with the frames 11a and 12a in their facing relation, the clip 73a is movable into and out of embracing engagement with both the edge pieces 18a and 38a to releasably retain the frames in their closed, facing relation. In the closed condition of the frames 11a and 12a, as in FIGURES 6–8, the clip 73a is embracingly engaged about the adjacent pair of frame pieces 18a and 38a, and the finger-actuable member 75a is located in proximate relation with the side-by-side handgrip portions 57a and 67a of the handles 52a and 62a. This conveniently locates the finger-actuable member 75a for swinging movement into and out of its latching condition, it requiring only a one-finger operation to swing the latching member from its solid-line, latching condition of FIGURE 6, to its dot-and-dash-outline release position. In the latter position, the frames 11a and 12a may obviously be readily swung apart or opened.

In both the embodiments of the instant invention described hereinbefore, it will now be appreciated that pieces of food, say of bread, meat, sandwiches, hamburgers, and a wide variety of other types of food may be quickly and easily placed between the reticulated, hinged frames and contained thereby for warming, heating or cooking in an automatic, pop-up-type toaster. Also, if desired, aluminum foil, or the like, may be employed to line the swingable frames, as for retaining the juices of meats during cooking in a toaster.

From the foregoing, it is seen that the present invention provides an accessory for toasters which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. An accessory for an automatic toaster of the type described having a pair of complementary frames, said frames having bottom edges and top edges and being hingedly connected together along their bottom edges so as to permit the frames to be brought into and out of facing relationship with each other, said frames being formed so as to be able to contain food and to be removably insertable into a toaster when in their facing relationship, and a pair of complementary handles respectively assembled to said frames, said handles extending outwardly from said frames and adjacent to each other when said frames are in their facing relationship so as to permit said handles to be held single handedly and latch means for said frames comprising an arm having a finger-actuable end, a clasp mounted on said arm and spaced from said end, said arm being pivotally connected to a respective assembly of frame and handle at a point of said arm spaced from said finger-actuable end, said arm being pivoted between a first position thereof in which said finger-actuable end is remote from said handles and a second position thereof in which said finger-actuable end is adjacent to said handles, said clasp in one of said positions of said arm being positioned and adapted to releasably engage and retain said frames when said frames are in their facing relationship and in the other of said positions of said arm being positioned and adapted to disengage said frames thereby allowing said frames to be separated, said finger-actuable end in both aforementioned positions being located proximate to said handles so as to permit manipulation of said finger-actuable end by the same hand as is holding said handles.

2. In an accessory for an automatic toaster of the type described having a pair of complementary frames, said frames having bottom edges and top edges and being hingedly connected together along their bottom edges so as to permit the frames to be brought into and out of facing relationship with each other, same frames being formed so as to be able to contain food and to be removably insertable into a toaster when in their facing relationship, and a pair of complementary handles respectively assembled to said frames, said handles extending outwardly from said frames and adjacent to each other when said frames are in their facing relationship so as to permit said handles to be held single handedly; latch means for said frames comprising an arm having a finger-actuable end, a clasp mounted on said arm and spaced from said end, said arm being pivotally connected to a respective assembly of frame and handle at a point of said arm spaced from said finger-actuable end, said arm being pivoted between a first position thereof in which said finger-actuable end is remote from said handles and a second position thereof in which said finger-actuable end is adjacent to said handles, said clasp in one of said positions of said arm being positioned and adapted to releasably engage and retain said frames when said frames are in their facing relationship and in the other of said positions of said arm being positioned and adapted to disengage said frames thereby allowing said frames to be separated, said finger-actuable end in both aforementioned positions being located proximate to said handles so as to permit manipulation of said finger-actuable end by the same hand as is holding said handles.

3. An accessory according to claim 1, the pivotal connection of said arm being intermediate its ends and being to said handle, said clasp being on the end of said arm remote from said finger-actuable end, said clasp being positioned and adapted to releasably engage and retain frames in said first position of said arm and to disengage said frames in said second position of said arm.

4. An accessory according to claim 1, the pivotal connection of said arm being on the end of said arm remote from said finger-actuable end and being to said frame, said clasp being mounted on said arm intermediate its ends, said clasp being positioned and adapted to releasably engage and retain said frames in said second position of said arm to disengage said frames in said first position of said arm.

5. An accessory for an automatic toaster, said accessory comprising a pair of complementary reticulated dished frames, said frames having bottom edges and top edges and being hingedly connected together along their bottom edges so as to permit the frames to be brought into and out of facing relationship with each other, said frames being formed so as to be able to contain food and to be removably insertable into a toaster when in their facing relationship, a pair of complementary handles respectively assembled to said frames, said handles lying substantially in the planes of said respective frames, each said handle having a generally vertical portion extending above the top edge of said frame and located adjacent a side edge thereof, and a generally horizontal handle portion extending from said first portion outwardly of said side edge of said frame, said handles being adjacent to each other when said frames are in their facing relationship so as to permit said handles to be held single-handedly, a latch means, having a lever pivotally mounted intermediate its ends on one of said handles adjacent the junction between the generally vertical portion and generally horizontal portion thereof, said lever being substantially in the plane of the handle to which it is connected and being turnable in said plane, one portion of said lever overlying the top edges of said frames when in their facing relationship, a clasp mounted on the end of said portion of said lever, the other end of said lever being shaped to overlie and be spaced from and proximate to said handle portion, said clasp being positioned and adapted to releasably engage and retain said adjacent frames when said frames are in their facing relationship, said finger portion being then remote from said handle portion, said finger portion then being positioned so as to permit manipulation thereof by the hand holding said handle so as to move said finger portion toward said handle portion, said clasp being thereby adapted to be moved out of engagement with said frames.

References Cited in the file of this patent

UNITED STATES PATENTS

| | | |
|---|---|---|
| 1,482,728 | Bracco | Feb. 5, 1924 |
| 1,630,879 | Winship | May 31, 1927 |
| 1,932,019 | Karron | Oct. 24, 1933 |
| 2,849,947 | Bork | Sept. 2, 1958 |